Figure 1:
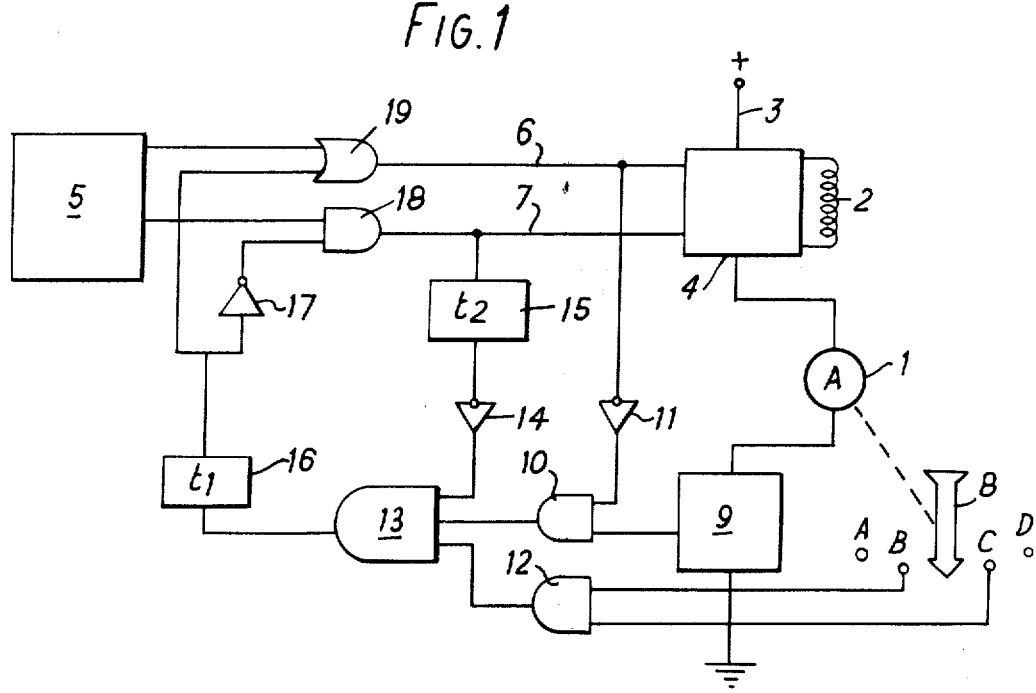

United States Patent [19]
Newson

[11] 3,891,909
[45] June 24, 1975

[54] DOOR OPERATING CONTROLS

[75] Inventor: John Chase Newson, London, England

[73] Assignee: Westinghouse Brake & Signal Co. Ltd., London, England

[22] Filed: May 29, 1973

[21] Appl. No.: 364,414

[30] Foreign Application Priority Data
June 5, 1972 United Kingdom............... 26218/72

[52] U.S. Cl. ............... 318/469; 318/467; 318/476; 318/282
[51] Int. Cl. ............................................. G05d 3/08
[58] Field of Search .......... 318/466, 467, 286, 282, 318/469, 293

[56] References Cited
UNITED STATES PATENTS

| | | | |
|---|---|---|---|
| 2,858,904 | 11/1958 | Heart | 318/293 X |
| 2,881,378 | 4/1959 | Russell | 318/469 X |
| 2,931,462 | 4/1960 | Heart | 318/293 X |
| 3,219,902 | 11/1965 | Sibley | 318/469 X |
| 3,539,894 | 11/1970 | Feldman | 318/469 X |
| 3,588,656 | 6/1971 | Shofner | 318/282 |
| 3,651,389 | 3/1972 | Ito et al. | 318/286 |
| 3,689,814 | 9/1972 | Holt | 318/466 X |

*Primary Examiner*—B. Dobeck
*Attorney, Agent, or Firm*—Larson, Taylor & Hinds

[57] ABSTRACT

A door operating control apparatus is provided for controlling the supply of power to an electric motor for opening and closing a train door of the sliding type which apparatus includes logic circuits responsive to motor loading at selected times and/or door positions during a door closing operation to cause the motor to be briefly stopped and reversed in the event of the supply current or voltage waveform to the motor indicating that an obstruction may be present in the doorway.

16 Claims, 2 Drawing Figures

DOOR OPERATING CONTROLS

This invention relates to door operating control apparatus for controlling doors which are actuated by an electric motor.

According to the present invention there is provided a door operating control apparatus for controlling an electrically actuated door, the apparatus including switching means for causing the actuator to drive the door between a first position and a second position, threshhold sensing means for producing a signal indicative of an increase of loading on the actuator when the door is in motion between said positions and means responsive to said signal for effecting a reversal of the motion of the door.

The apparatus may be provided with means whereby said reversal is over a predetermined time span or a predetermined distance span.

The actuator may be an electric motor and its direction of rotation may determine the direction of door motion.

The apparatus may further be so arranged that following a reversal over said time or distance span a further reversal is effected to cause the motor to return to its original direction of motion.

The means for producing asignal indicative of increase of motor load may include a threshold circuit responsive to occurrence of more than a predetermined motor current.

Means is preferably included to make the apparatus unresponsive to normal motor starting currents.

Figure 2:
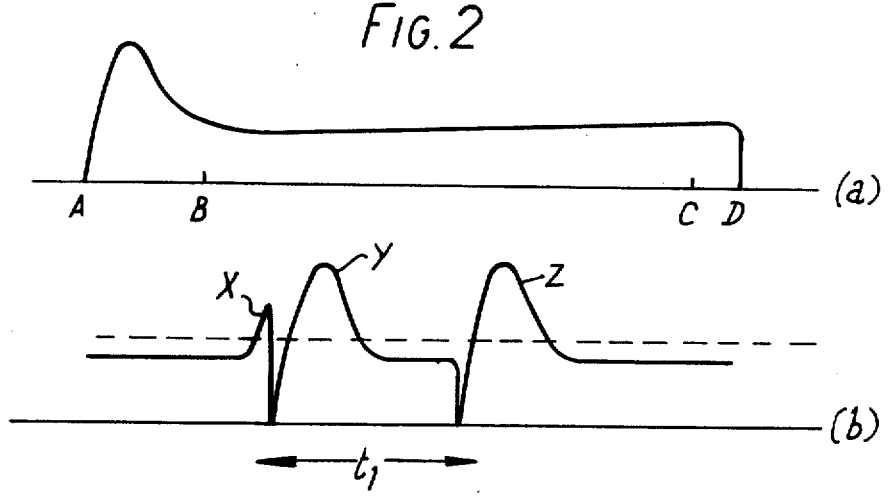

In order that the invention may be more clearly understood and readily carried into effect, the same will be further described by way of example with reference to the accompanying drawing of which:

FIG. 1 illustrates a logical circuit arrangement of apparatus embodying the invention and FIG. 2 illustrates graphically operation of the apparatus of FIG. 1.

Before discussing the drawing, it will be understood that the apparatus is for application especially to the type of door which is employed, for example, on rapid transit or underground type railway trains where it is often required to provide common means for operating all the doors on a train. In such an application, it is desirable to provide a control circuit which is operable over the full length of the train to energise all the passenger doors either to open or close at a single command. Typically, the means for driving the doors comprises an electrically operated actuator which may be a motor driven actuating arm coupled to the door, by which means the door can be moved between an open and a closed position. The actuator arm moves through an arc and the motor torque can vary in accordance with the position of the door, not to mention external effects such as passengers or articles obstructing the free operation of a door. Accordingly, the apparatus about to be described provides means whereby a signal can be produced for causing the motor which is driving a door to be reversed in the event of obstruction causing the loading on the motor to attain a certain threshhold level, in order to enable the motor to reverse and thereby free the door obstruction.

Referring to FIG. 1, the electric motor for driving a door is of the d.c. series type and has an armature 1 and series field winding 2. These are supplied from a positive d.c. supply terminal 3 through a motor switching unit 4 which is controlled by a door control box denoted by the block 5. The control box 5 provides an "open" command signal on the line 6 or a "close" command signal on the line 7. An arrow 8 is shown in the drawing which indicates a range of possible positions of the door during operation from the open position A through an intermediate range of positions between points B and C to the fully closed position D. In series with the motor comprising armature 1 and field winding 2, there is a threshhold circuit indicated by the block reference 9 the output of which is applied to an AND gate indicated by the block reference 10 the second input to which is derived via a block 11 which performs a logical inversion from the signal condition of the open command line 6. A further AND gate is indicated by the block 12 and this receives inputs from door position sensors indicative of the position of the door (i.e. the arrow 8). Thus, assuming the door is between points B and C, the input associated with point B receives a 1 input and the input associated with the point C also receives a 1 input. Outputs of gates 10 and 12 are applied as inputs to a third AND gate indicated by block 13 which has a third input derived via a block indicated at 14 which performs logical inversion of the output from a first interval timer 15, a starting signal to which is derived from the line 7. The timer 15 times a first interval $t_2$ which represents a small proportion of the time for a door to move from A to D. The output of the gate 13 is applied as a start input to a second interval timer denoted by reference 16 the second timing interval of which is $t_1$. The output of timer 16 applied via a circuit indicated by block 17 and performing and inversion an an equivalent inhibit to an AND gate indicated by block 18 in the line 7 and as an enabling input to an OR gate indicated by block 19 in the line 6 between the control box 5 and the unit 4.

In operation of the apparatus of FIG. 1, assuming that the door is initially in the open position and is required to be closed, the driver actuates a door operating switch in or on the box 5 and this applies a close command via the gate 18 and the line 7 to the unit 4. Timer 15 is started. This command may also be generated via box 5 from some remote point. Power is applied to the motor via unit 4 which at the same time switches the field winding 2 into the appropriate polarity in relation to the armature 1 to cause the motor to drive the door towards the closed position. Initially a starting surge of current flows in the armature 1. This is sensed as greater than a predetermined threshhold by the threshhold unit 9 and an output is produced thereby to the gate 10. Since the command line 6 is not energised, an input is present at the other input to the AND gate 10 so that this threshhold signal is applied to the gate 13. However, since the door at this stage is in the range of positions between points A and B, no enabling input is present on the upper input line to the gate 12 and the gate 13 therefore produces no output to the timer 16. The threshhold unit 9 is also prevented from providing an input to 16 at this time as timer 15 has not yet timed out. It is necessary for the timer 15 to have timed out to enable an input to be present, via the logical inversion 14, at one input to the gate 13. An instant can be considered when the arrow 8 is between points B and C, the arrangement is such that at this time both inputs are present on the gate 12 to indicate that the door is neither between A and B nor between C and D. The timer 15 should now have timed out such as to apply an enabling input to the uppermost input terminal of the gate 13. If therefore the door engages an obstruction in the region C to D, the motor will experience a load above the threshhold in attempting to move the door against the obstruction and there is an increase of motor current which causes an output to be applied via the gate 10 to the gate 13. The other two inputs to gate 13 are at this time fully enabled, so the output of gate 13 starts the timer 16 and its output initiates a reversal of the direction of the motor by disabling the AND gate 18 via the logical inversion 17 negating the close command and applying an input to the OR gate 19 to simulate an open command on the line 6. As soon as the timer 16 has timed out, the gates 18 and 19 are returned to their initial conditions and closure of the door is resumed. Assuming no further obstruction exists, the door proceeds past the position C to the closed position, D.

It will be noted that the creation of an open command on the line 6 removes the previously existing enabling input to the AND gate 10 so that the starting surge for the motor when it reverses to open the door whilst detected by the threshold unit 9, is not transmitted via the gate 10 to the gate 13. Timer 15 is started by the reversion of gate 18, blanking the close surge. The system therefore ignores both starting surges which are produced on a motor reversal which occurs during a door closing operation in the event of an obstruction being present.

It will be seen from the foregoing that there is a region AB and another region CD of the travel of the door which the apparatus is insensitive, through the action of gate 12, to motor loading above the threshhold. The region AB is provided to accommodate for the starting surges of the motor on initiation of a closing operation and the current in the motor for a complete closing operation with no obstructions is shown by curve (a) in FIG. 2. The disabling function of gate 12 is augmented by the timer 15 which times out an interval $t_2$ which approximates to the time of travel between A and B. The curves (b) of FIG. 2 illustrate the current curves for the motor on encountering an obstruction in the interval from B to C. The tripping current which trips the timer 16 is denoted at X. The current which occurs on reversal of the motor is shown at Y. The current on restarting towards the closed position is denoted at Z.

An obstruction which is encountered when the door is in the regions CD of its span, is ignored by the apparatus since this is a small region provided to accommodate the normal resilience in the rubber edge or door stop. Accordingly, a small obstruction encountered by the door at this stage, would be ignored by the apparatus.

In a typical installation for a 36 inch wide door with a travel time of 3 seconds nominal (up to 5 seconds at reduced voltage etc.) timers $t_1$ and $t_2$ would have an interval of between 0.1 and 0.5 seconds. This would permit the door to reverse up to about 5 inches from an obstruction point. It should be noted that, in practice, timer 15 is initially overridden by the position sensor for point B and is only really effective during a reversal.

While the foregoing description of the apparatus is based upon means for sensing the occurrence of an overcurrent or surge in the motor which exceeds a threshhold level, the apparatus may equally be operated by means for sensing more than a certain rate of change of current in the motor. Alternatively, a rate of change of voltage on the motor armature or a fall of motor back e.m.f. may be sensed or the rate of change thereof may be sensed. All such parameters may be regarded as examples of parameters suitable for sensing the occurrence of an increase of motor load. Again, in an alternative arrangement utilising the invention, the apparatus may have means for sensing every second occurrence of more than a set rate of increase of current in the motor. In such a manner, the system may be arranged inherently to ignore motor starting surges. Again, it may be desired to incorporate in the system means for providing a suitable alarm in the event of more than a certain number of reversals of the motor occurring during a given traverse of a door between a position A and a position B. In order to achieve this, a counter may be provided in the apparatus an output of which counter corresponding to the predetermined number of reversals is utilised to initiate the alarm. Furthermore the extent of the reversal timed by timer 16 is a matter of choice and can be equivalent to a complete re-opening of the door.

Having thus described our invention, what we claim is:

1. A vehicle door operating apparatus comprising an electrical power source, an electric motor, an electrical threshold sensor connected in the circuit of said motor for sensing the occurrence of an abnormal magnitude of an electrical quantity corresponding to a loading of the motor in excess of a normal moving door loading and for producing an output signal in accordance therewith, an open and closed door control means, operable to cause the motor to drive the vehicle door in an opening mode towards an open position and, alternatively, in a closing mode towards a closed position, for, responsive to said output signal from said threshold sensor, changing the mode of operation of the apparatus, door position sensors located at points along the path of the door movement near to each end thereof, and a logic unit connected to the output of said threshold sensor and to said door position sensors.

2. An apparatus as claimed in claim 1 wherein said change of mode comprises a reversal of the direction of motion of said door, said reversal taking place over a predetermined span of a given parameter.

3. Apparatus as claimed in claim 1 in which the logic unit includes a first gate to inhibit the connection of th threshhold sensor output except when the door position sensors supply outputs on the door being between said points.

4. Apparatus as claimed in claim 3 in which the control means has two control paths, a "door close" path and a "door open" path each selectively energised to operate a switching unit appropriately to supply power to the motor.

5. Apparatus as claimed in claim 4 in which the logic unit includes a first timer to provide an output during a first interval timed from the selective energisation of the "door close" path, the first gate being responsive to the timer output to inhibit the connection of the threshhold sensor during the first interval.

6. Apparatus as claimed in claim 5 in which the logic unit includes a third gate to inhibit the selective energisation of the "door close " path in response to the passage of the threshhold output through the first gate.

7. Apparatus as claimed in claim 6 including between the first gate and the third gate, a second timer to provide an output during a second interval timed from the output of the threshhold output from the first gate, the third gate being responsive to the timer output to inhibit the "door close" path during the second interval, and including a fourth gate in the "door open" path and enabled by the timer output to selectively energise the "door open" path for the second interval.

8. Apparatus as claimed in claim 1 in which the logic unit includes a gate to inhibit the connection of the threshhold sensor output except when the door is moved in the closing mode.

9. Apparatus as claimed in claim 1 including a gate to which the connections from the position sensors are inputs, the gate having an output connected to inhibit the passage of the threshhold sensor through the logic unit when the door is not between said points.

10. An apparatus as claimed in claim 2 wherein said given parameter is time.

11. An apparatus as claimed in claim 2 wherein said given parameter is distance.

12. An apparatus as claimed in claim 2 further comprising means responsive to the achievement of said predetermined span for causing the door to continue in the original direction of motion.

13. A vehicle door operating apparatus comprising an electrical power source, an electric motor, an electrical threshold sensor connected in the circuit of the said motor for sensing the occurrence of an abnormal magnitude of an electrical quantity corresponding to a loading of the motor in excess of a normal door closing loading and for producing an output signal in accordance therewith, door control means operable to cause the motor to drive the vehicle door in a closing mode towards a closed position from an open position and, responsive to said output signal from the threshold sensor, to interrupt the said closing mode, door position signalling means for producing an output signal when the door is in a position near to the said open position thereof, and logic means connected to the threshold sensor and the door position signalling means for inhibiting the said interruption of the closing mode when the door is in a said near position responsive to said output signal from said position signalling means.

14. A vehicle door operating apparatus as claimed in claim 13 wherein said door control means includes means for causing said motor to drive said vehicle door in an opening mode towards said open position and for interrupting said opening mode responsive to a said output signal from said threshold sensor, said logic means including means for actuating said door control means to cause said motor to drive said vehicle door in said opening mode when said closing mode is interrupted and timing means for inhibiting the interruption of said opening mode when said door control means is actuated by said actuating means of said logic means.

15. A vehicle door operating apparatus as claimed in claim 14 wherein said door control means causes said motor to drive said vehicle door in a resumed closing mode after a predetermined time after said door control means is actuated by said actuating means and said logic means inhibits the interruption of said resumed door closing mode for a predetermined period.

16. A vehicle door operating apparatus as claimed in claim 15 wherein said logic means includes a first timer which both inhibits interruption of said closing mode when the door is in a said near position and inhibits interruption of said resumed door closing mode and a second timer which inhibits interruption of said door opening mode when said door control means is actuated by said actuating means.

* * * * *